(12) United States Patent
Silberg et al.

(10) Patent No.: US 7,738,993 B2
(45) Date of Patent: Jun. 15, 2010

(54) EXTRUSION OF ARTICLES

(75) Inventors: Kevin Silberg, Big Lake, MN (US); Jeffrey S. Lindquist, Maple Grove, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 828 days.

(21) Appl. No.: 10/683,081

(22) Filed: Oct. 10, 2003

(65) Prior Publication Data

US 2005/0080507 A1     Apr. 14, 2005

(51) Int. Cl.
*G06F 7/66* (2006.01)
(52) U.S. Cl. ............... 700/196; 264/40.1; 425/135
(58) Field of Classification Search .......... 700/196; 264/40.1, 40.6, 165, 167, 209.4, 250, 407; 425/113, 135; 604/523, 526, 527, 96.01, 604/264, 525, 915
See application file for complete search history.

(56) References Cited

U.S. PATENT DOCUMENTS

| | | | |
|---|---|---|---|
| 3,914,356 A | 10/1975 | Dembiak et al. | |
| RE29,886 E | 1/1979 | Dembiak et al. | |
| 4,209,476 A | 6/1980 | Harris | |
| 4,330,497 A | 5/1982 | Agdanowski | |
| 4,480,981 A * | 11/1984 | Togawa et al. | 264/40.6 |
| 4,490,316 A | 12/1984 | Satzler | |
| 4,540,537 A | 9/1985 | Kamp | |
| 4,546,723 A * | 10/1985 | Leopold et al. | 118/669 |
| 4,613,471 A * | 9/1986 | Harris | 264/40.1 |
| 4,693,855 A | 9/1987 | Herbert | |
| 4,721,589 A | 1/1988 | Harris | |
| 4,749,347 A | 6/1988 | Valavaara | |
| 4,777,951 A * | 10/1988 | Cribier et al. | 604/96.01 |
| 4,804,557 A | 2/1989 | Anthony, Jr. et al. | |
| 4,828,770 A | 5/1989 | Fabian et al. | |
| 4,882,104 A | 11/1989 | Dobrowsky | |
| 4,888,146 A | 12/1989 | Dandeneau | |
| 5,128,084 A | 7/1992 | Tompkins et al. | |
| 5,134,569 A | 7/1992 | Masters | |
| 5,149,193 A * | 9/1992 | Faillace | 264/40.6 |
| 5,198,161 A | 3/1993 | Ogura et al. | |
| 5,277,199 A * | 1/1994 | DuBois et al. | 604/915 |
| 5,382,395 A | 1/1995 | Hoenke | |
| 5,445,624 A * | 8/1995 | Jimenez | 604/264 |
| 5,499,973 A * | 3/1996 | Saab | 604/264 |
| 5,622,665 A | 4/1997 | Wang | |
| 5,693,174 A * | 12/1997 | Nakata et al. | 156/361 |
| 5,725,814 A | 3/1998 | Harris | |
| 5,795,325 A * | 8/1998 | Valley et al. | 604/509 |
| 5,836,925 A * | 11/1998 | Soltesz | 604/525 |
| 5,897,537 A * | 4/1999 | Berg et al. | 604/525 |
| 5,911,715 A * | 6/1999 | Berg et al. | 604/525 |
| 5,951,930 A | 9/1999 | Takemori et al. | |
| 6,165,399 A * | 12/2000 | Guntherberg et al. | 264/143 |
| 6,190,153 B1 * | 2/2001 | Tsuzukiyama et al. | 425/135 |
| 6,579,484 B1 * | 6/2003 | Tiernan et al. | 264/209.4 |

(Continued)

*Primary Examiner*—Charles R Kasenge
(74) *Attorney, Agent, or Firm*—Crompton, Seager & Tufte, LLC

(57) ABSTRACT

An extrusion control system for use with one or more extruders has a data acquisition module in communication with one or more data acquisition nodes that are associated with an extrusion process. A control module is also in communication with one or more control nodes associated with the extrusion process. A synchronization signal to one or more control nodes causes the nodes to adjust to a predetermined setting.

23 Claims, 6 Drawing Sheets

U.S. PATENT DOCUMENTS

| | | |
|---|---|---|
| 6,627,127 B1 | 9/2003 | Piovoso et al. |
| 6,755,564 B2 * | 6/2004 | Eiva ........................... 366/145 |
| 6,970,734 B2 * | 11/2005 | Eidenschink et al. ........ 604/529 |
| 7,229,431 B2 * | 6/2007 | Houser et al. ............... 604/528 |
| 2003/0030165 A1 | 2/2003 | Centell et al. |
| 2003/0132552 A1 | 7/2003 | Gamble et al. |
| 2003/0211189 A1 * | 11/2003 | Eiva ........................... 425/145 |

* cited by examiner

EXTRUSION OF ARTICLES

TECHNICAL FIELD

This invention relates to methods and apparatuses for making extruded articles, and more particularly to methods and apparatuses for making extruded articles having varying cross-sections and materials using closed-loop control.

BACKGROUND

Many articles today are made using extrusion processes. Extrusion is generally a continuous process whereby a material, such as a thermoplastic, is conveyed in a melted form through a die that has a desired cross section. The material exits the die and quickly cools into its final, solid form. Thus, extrusion is an effective continuous process for making products such as tubes, films, piping, weather-stripping, window frames, and other articles having a constant cross-section. For such articles, the extrusion process is efficient, convenient, and can run continuously to produce high volumes of product. Extrusion differs from discontinuous batch processes such as injection molding, that make single, separate articles, and can produce articles having complex shapes without much effort.

Articles that vary in their material composition or in the cross-sectional shape may also be produced via extrusion, however. For example, the cross-sectional diameter of a tube may be varied by varying the air pressure introduced into the interior of the tube as it leaves the extruder die. Also, the materials being fed to the extruder may be changed in process or in situ if different parts of an article require different material properties.

The extrusion of discontinuous articles is much more complicated than continuous extrusion of constant cross-section and constant material articles. Articles formed by continuous extrusion may generally be produced by establishing the production parameters through trial-and-error when an extrusion line is first started. The extruder may then be operated continuously with little attention from the operator, except for infrequent and minor variations and corrections. The material that must be discarded during the initial set-up and calibration is generally very small in relation to the total product produced. On the other hand, the conditions in a discontinuous extrusion system are, of necessity, always changing. As a result, various transient conditions can encroach on the production process. These conditions must be accounted for before the article of interest exits from the extruder system. And because the percentage of wasted material is best kept to a minimum, the slow, trial-and-error calibration method is generally not appropriate for discontinuous extrusion operations. Moreover, it can be difficult to produce quick transitions in materials or in the extrusion geometry. These difficulties in producing a satisfactory discontinuous article by extrusion are compounded when the article being produced has extremely tight tolerances (whether for geometry, materials, or performance). The problems are further compounded over time as a system operates, because the various system parameters may each drift away from their appropriate set points.

As one example, angioplasty balloon catheters may be produced in part or in whole by extrusion. Such catheters are generally comprised of a small, flexible, but strong, hollow plastic shaft, with an expandable balloon mounted at its distal end, along with a tapered, flexible tip. The catheter must generally be capable of being threaded through a vessel or artery so that the balloon may be placed at a site in the patient, for example, where there has been arterial stenosis. To provide the required combination of flexibility and strength, it may be necessary to form different parts of the catheter out of different materials that have different degrees of compliance, or softness, within a single catheter assembly. It may also be preferable to form a single piece possessing gradual, consistent, property transitions instead of producing multiple pieces and then joining them together, such as by sonic welding or with adhesive bonding. Improved profile dimensions may also be achieved by forming the balloon with its tapered tip in the same process as the balloon and the shaft. Each of these steps requires discontinuities in the material leaving the extruder, whether in terms of material or geometry, and creates difficulties in controlling the extruder output.

Systems that simply monitor processing variability and react to maintain a desired part dimension are generally inadequate to produce articles having discontinuities and very tight tolerances, where numerous independent process parameters can affect numerous attributes of the article. As a result, there is a need for a system and method that provide accurate control over a discontinuous extrusion process.

SUMMARY

In general, a device and method for producing extruded items is disclosed. The items may be made up of a plurality of repeating or non-repeating parts that may be separated into individual parts after being extruded. In producing the items, the device may be equipped with a control system that repeatedly resynchronizes one or more of the control points that control the extruder operation.

In one embodiment, an extrusion control system for use with one or more extruders is disclosed. The system comprises a data acquisition module in communication with one or more data acquisition nodes that are associated with an extrusion process, a control module in communication with one or more control nodes associated the extrusion process, and a synchronization signal generator that generates a synchronization signal for the one or more control nodes to cause the one or more control nodes to adjust to a predetermined setting. A part profile, which may comprise a representation of the outer diameter of an extruded part (including a minimum specified part profile and a maximum specified part profile), may also be provided that corresponds to the extruded part to be produced by the one or more extruders. The synchronization signal generator may generate a synchronization signal at a substantially repeating period, such as a period that is a function of the length of the extruded part, including by being generated for each part. A first event marker (which may correspond to the beginning or the end of a part profile) may also be provided in association with the part profile, whereby the synchronization signal generator generates a synchronization signal when the system encounters the event marker. The data acquisition module and the control module may each be in communication with a computer that monitors and controls the operation of the one or more extruders. The computer may have a display that presents an image of the part profile.

The synchronization signal generator and the signal itself may take a variety of forms. The generator may communicate with each of the one or more control nodes over a dedicated communication channel or a shared communication medium, and the synchronization signal may comprise a synchronization pulse. The system may also comprises a velocity sensor that allows the velocity of an extruded article to be measured, and a data acquisition node having a laser gauge that acquires data relating to the outside diameter of an extruded article produced by the extrusion process. The control module may also be in communication with a PID controller associated with a variable speed drive for the extruder, by which the synchronization signal causes the PID controller to return to a preset speed. The control module may also carry out a PID control sequence after the synchronization signal generator generates the synchronization signal, and the control module may communicate with control nodes on more than one extruder, such as by causing a switchover form a first material in a first extruder to a second material in a second extruder. The control module may also be in communication with a sizing air device controller associated with an extruder, so that the synchronization signal may cause the sizing air device controller to set to a predetermined value. A reporting module may provide data acquired by the data acquisition modules.

In another embodiment, a method of producing an extruded article comprised of a plurality of extruded parts is disclosed. The method may comprise the steps of defining a part profile, associating a plurality of control parameters with the part profile, wherein each control parameter has an initial value, producing a first extruded part using the plurality of control parameters in a closed-loop control system, resetting each of the plurality of control parameters to its initial value, and producing a second extruded part using the plurality of control parameters in a closed-loop control system. The resetting step may comprise sending a synchronization signal such as a pulse to a plurality of control nodes. The signal may be transmitted on a dedicated communication path, and may be sent after the first extruded part is produced but before the second extruded part is produced.

In yet another embodiment, an extruded article is disclosed. The article comprises a plurality of extruded parts, a plurality of material transitions, wherein each part contains at least one material transition, and wherein the material transitions are each shorter than 0.25 inches in extruded length. The article may include more than 30 or more than 50 extruded parts.

A plurality of extruded parts produced as part of a substantially continuous extrusion process is also disclosed. The parts have a first section on each of the plurality of extruded parts having a constant outside diameter; a second section on each of the plurality of extruded parts having an increasing outside diameter, wherein the outside diameter of the first section of each of the plurality of extruded parts is substantially identical to the outside diameter of the first section of each of the other extruded parts; and wherein the outside diameter along the second section of each of the plurality of extruded parts is substantially identical to the outside diameter along the second section of each of the other extruded parts. The outside diameter of the first section of the first extruded part may differ from the outside diameter of the first section of any other of the plurality of parts by no more than 0.0010 or no more than 0.0005 inches.

An extruded catheter is also disclosed, comprising a catheter tip made of a first plastic material, a balloon having an expanding portion, a middle portion, and a contracting portion, and a catheter shaft defining a lumen connected to the contracting portion, wherein the catheter shaft has a transition zone smaller than 0.25 inches in which the catheter shaft transitions from the first plastic material to a second plastic material.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
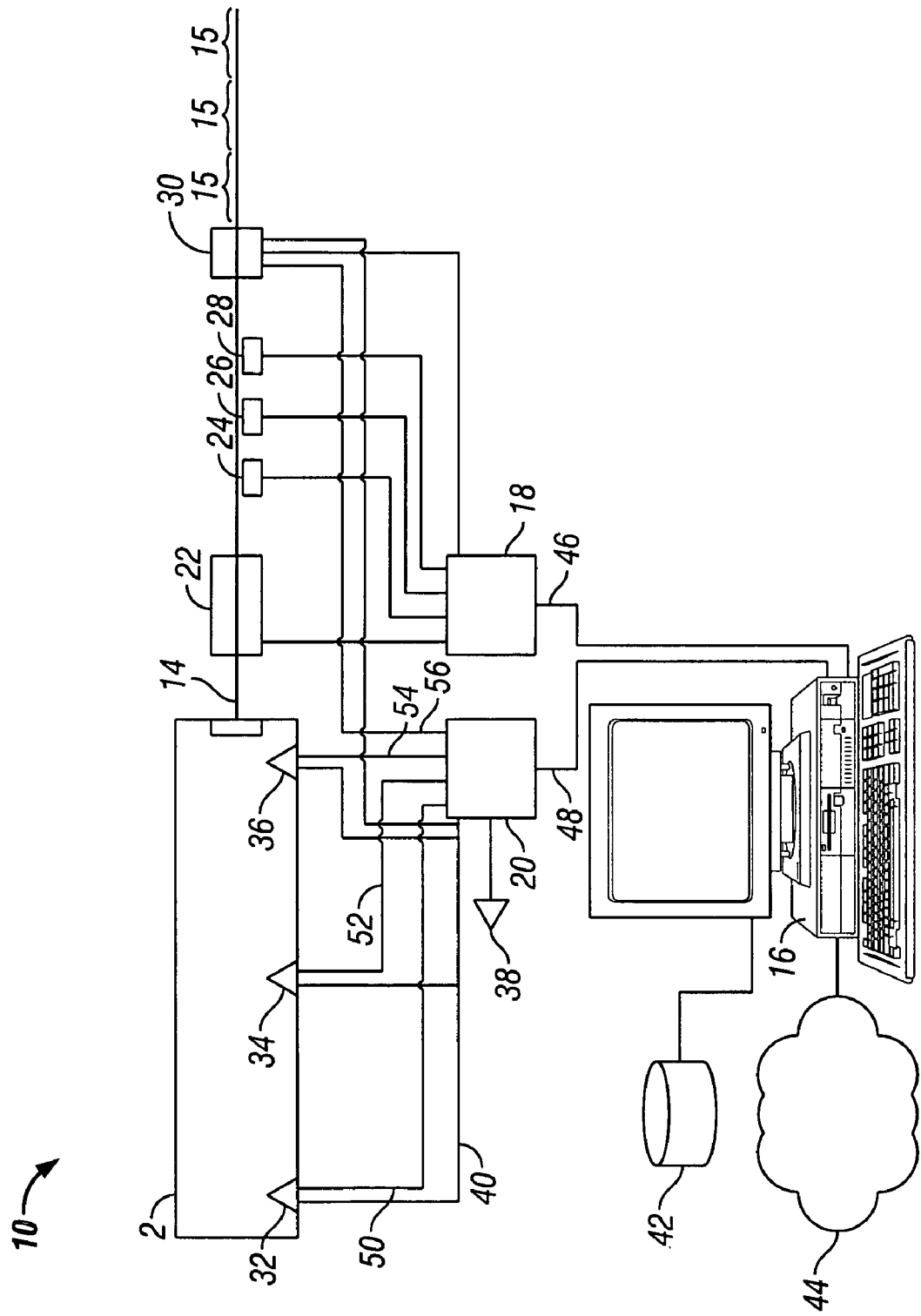
FIG. 1 is a schematic diagram of an extrusion control system.

FIG. 1 is a schematic diagram of an extrusion control system 10 capable of controlling the operation of one or more extruders. In general, system 10 is provided with controls that allow it to produce an article of varying performance properties or dimensions, which may be referred to as a discontinuous article, using a continuous or substantially continuous extrusion process. System 10 is connected to extruder 12 that receives material, such as thermoplastic pellets in a solid form, melts the material, and conveys the material through a die to form an extruded article 14. Extruder 12 may be adjoined to one or more other extruders (not shown) in the die region in a multi-extrusion or co-extrusion system, whereby each extruder is loaded with one raw material composition, and the system 10 may be switched over in-process from one material to the other.

Extruded article 14 may be comprised of a plurality of extruded parts 15, which may be obtained by cutting article 14 into discrete sections after it has been extruded. Extruded parts 15 may be repeated matching parts, such as medical balloon catheters. Also, extruded article 14 may be cut into parts after each part exits extruder 12. In this manner, the various parts that form an article can be produced in a continuous process, and then may be cut apart for further processing or use.

System 10 may control extruder 12 using computer 16. Computer 16 may obtain information regarding the operation of extruder 12 through data acquisition module 18, and may provide signals to operate extruder 12 through control module 20. Although data acquisition module 18 and control module 20 are pictured as separate modules lying outside computer 16, and connected to computer 16 by separate data paths, they could be connected to a common bus, and could be components inside computer 16, such as expansion cards, or could be integrated with computer 16. The modules could also be integrated with each other as a single hardware or software module. In particular, the interfaces between computer 16 and extruder 12 can take any of a variety of appropriate forms, as understood by a skilled artisan.

Data acquisition module 18 may be connected to a variety of sensors or other devices for determining the current status of extruder 12 or extruded article 14. For example, extruded article 14 may pass through a cooling device 22 after exiting extruder 12, and the temperature and location of cooling device 22 may be monitored. Laser gauge 24 may be provided near the exit of extruder 12 to generate a signal that allows the outer diameter of the extrudate to be determined. A second laser gauge (not pictured) may also be provided (either separately from, or combined with, laser gauge 24) to allow for the measurement of ovality of the tube. Durometer 26 may be provided to allow for the measurement of hardness of the extruded article 14. In addition, laser velocity gauge 28 may be provided to allow for the measurement of the extruded article's velocity. Data may also be acquired from mechanical pulling device 30, which grips extruded article 14 and maintains a controlled amount of tension on article 14. Other data acquisition devices may also be used, including devices using ultrasonic and magnetic resonance imaging (MRI) technologies.

Data acquisition module 18 may be used to aggregate data that is collected by the various sensors or other devices. For example, one or more of the devices may be configured to obtain data at a very high rate or granularity, such as by 2833 scans per axis per second by laser gauge 24. If multiple devices are connected to computer 16, each with very high data acquisition rates, computer 16 may be incapable of digesting all of the data simultaneously while also communicating with control module 20, or may have no need for all of the data. Thus, each device may process the data it receives, and pass a subset of that data or a more compact representation of the data (such as an average of samples over wider sampling periods) to data acquisition module 18. Alternatively, data acquisition module 18 may receive all sampled data from a device and then process the data before forwarding it to computer 16.

Control module 20 receives signals from computer 16 and communicates with various nodes that may control extruder 12. For example, control module 20 may send signals through line 50 to a variable speed drive or a stepper motor 32 that is part of extruder 12. Control module 20 also may generate signals and send them via line 52 to modulate a heater 34 of extruder 12. Control signals may also be sent to sizing air device 36 via line 54 to regulate the air pressure that is introduced into the inside of extruded article 14, and thereby control the inner diameter of article 14. The inner diameter of the article may be controlled by adjusting the relative speeds of the extruder 12 and pulling device 30, such as by sending control signals through line 56. The devices that receive signals from control module 20 may take any of a variety of forms that are well known, and may comprise multiple servo motors or other control mechanisms connected to the system.

Data may be transferred between data acquisition module 18 and computer 16 by data bus 46. Likewise, information may be transferred between control module 20 and computer 16 by control bus 48. Alternatively, data bus 46 may be positioned between data acquisition module 18 and the data acquisition nodes, and control bus 48 may be positioned between control module 20 and the control nodes. For example, data acquisition module 18 and control module 20 may each be connected to a SCADA bus, such as an Ethernet network (either shared or switched) and communicate with their respective nodes over that network. Moreover, multiple extruders may be connected to a single computer, either with one control module and one data acquisition module for each computer, or one control module and one data acquisition module for each extruder, or by other appropriate arrangement. A single bus or network may be used for the communication, or multiple buses or networks may be used, as appropriate, for the particular application.

Computer 16 may be any structure that provides an operating environment suitable for implementing the techniques described in this application. For example, computer 16 may contain a processor connected to system memory (including ROM and RAM) through a bus controller and a system data/address bus. Computer 16 may be any server, personal computer, laptop or even a battery-powered, pocket-sized, mobile computer known as a hand-held PC or personal digital assistant (PDA). Computer 16 may also connect to other devices, such as a video adapter and display, internal or external fixed disk, floppy disk, optical or tape media, and modem, keyboard, mouse, or microphone.

In addition, data received by computer 16 or generated by computer 16 may be stored in database 42, including acquired data (such as measured parameters of the extruder 12) and process data (such as information regarding particular articles that are to be manufactured using extruder 12). Computer 16 may also be connected to a network 44 that is separate from, or combined with, the network by which computer 16 communicates with extruder 12. This network 44 may include a corporate intranet or the Internet. In this manner, computer 16 may communicate information about the performance of the system with other computers, including computers at remote locations, and may also receive information, such as recipe information that specifies the various parameters of a part to be extruded by system 10.

Synchronization bus 40 may also be provided between control module 20 and its related nodes. Synchronization bus 40 may carry a synchronization signal to cause one or more of the control nodes to set themselves to a particular value. For example, each node may have a preset starting value for its operation, and a signal on synchronization bus 40 could cause the nodes to each begin operating anew from that preset starting value. The synchronization signal may help alleviate problems of drift that arise in the use of control systems, particularly where multiple different parameters are being controlled simultaneously. In particular, the various process parameters may all be arranged so that the system is producing a desired output, but each node may be at a point, especially when combined with each of the other nodes, at which the system as a whole is very unstable, and small variations in one or more inputs could have a major impact that would negatively affect the characteristics of the article in an appreciable manner. The synchronization signal allows the various inputs to be set to values that can be expected to provide accurate and stable control of the process output. Although synchronization bus 40 is shown in the figure as a dedicated communication line, the synchronization signal could also be sent on a network that carries other communications between control module 20 and the controlled nodes, or in any other appropriate manner. In addition, the synchronization signal may take any of a variety of forms, such as an electrical pulse, a combination of signals, or a appropriate multi-bit representation that is recognized by the nodes as a indication that resynchronization should occur.

An example of the operation of the synchronization signal may provide a better understanding of the signal value to the system. In operation, each of the control nodes generally adapts to various conditions that it "sees," so that although that node is maintaining a desired output at any given moment, it may have drifted far enough from its set point that a small change in conditions will cause the system to be unable to maintain its desired output. As an example, sizing air device 36 may be required to produce a certain inner diameter for extruded article 14, and may need to maintain a particular pressure within extruded article 14 to do so. To produce that pressure initially, sizing air device 36 may need to be provided with a particular starting voltage, and that voltage may need to be altered as production continues to further maintain the pressure. After a time, the voltage applied to sizing air device 36 may be substantially different from the starting voltage that was needed to maintain the desired pressure. Although the modified voltage may currently be providing the appropriate pressure, when combined with all the other surrounding factors that affect the composition of extruded article 14, the present voltage may make for a relatively unstable system. By causing the various nodes to return to their start values, the synchronization signal can return the entire system 10 to a point of known stability at which the extruded article 14 meets its intended specification.

Where the system is set up to produce a number of repeating parts 15, the synchronization signal may be timed to reset the various control nodes near the transition from one part 15 to the next. In this manner, any transient change in the any measurable attribute of the extruded article 14 (such as a step or near-step increase or decrease in its outer diameter) will occur in an area that is non-critical and that could be separated and discarded when the parts 15 are separated out of the extruded article 14. Such a periodic synchronization signal may also impart a degree of repeatability for the various attributes of the parts. In particular, the point in the production of each article at which the synchronization signal is provided, or some point a known distance from that point, may be used as a base from which to identify and compute various attributes for each part. For example, geometry transitions such as tapers, may be measured from the base point for each part, thereby eliminating any accumulated error across multiple parts in identifying the position of extruded article 14. As a result, the longitudinal alignment of each part may be closely determined, and may be used to improve the degree of control over the various attributes of each part.

Figure 2:
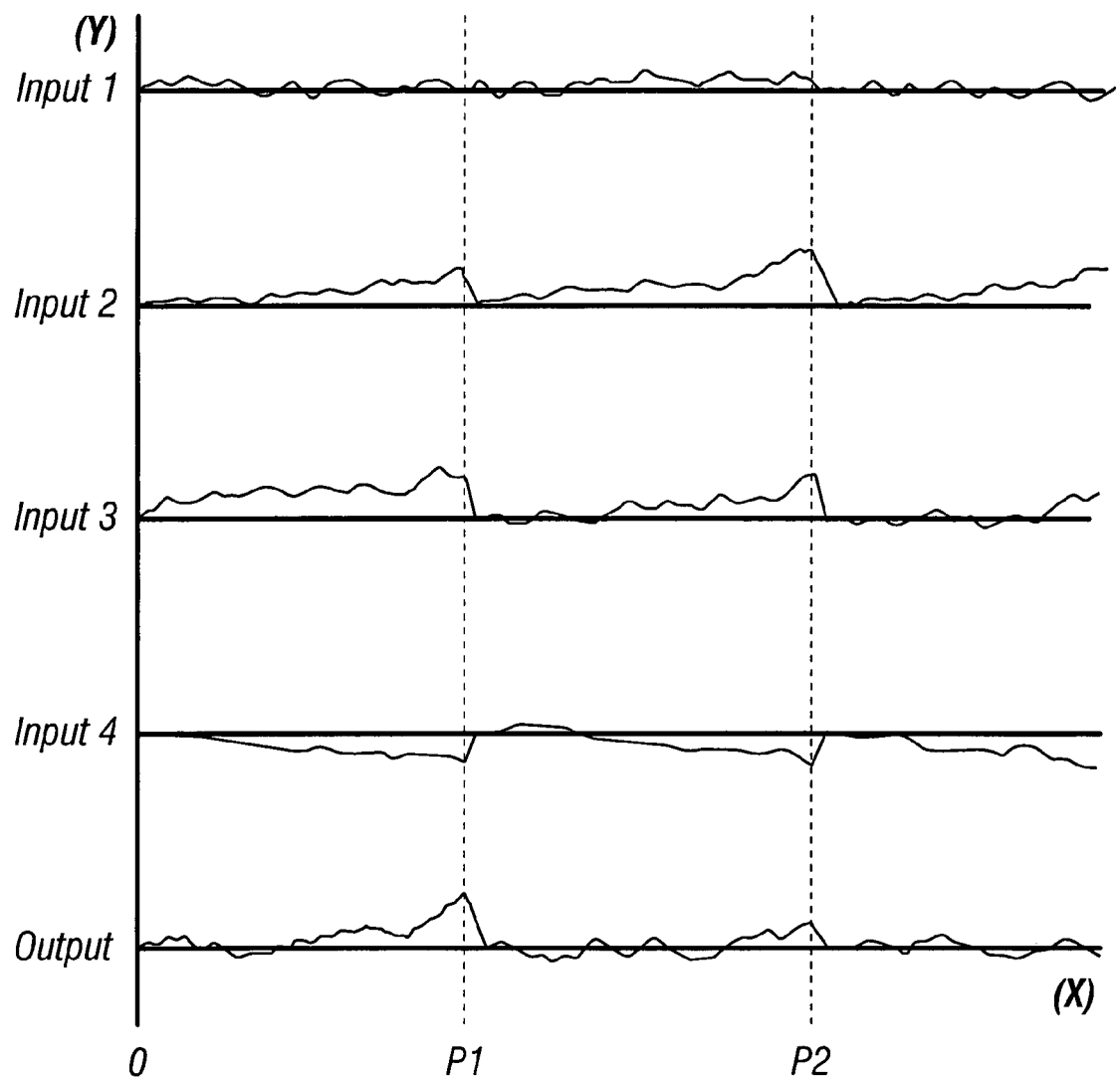
FIG. 2 shows graphically a comparison of extrusion process inputs and a corresponding extrusion process output.

FIG. 2 shows diagrammatically a comparison of extrusion process inputs and a corresponding extrusion process output in comparison to the use of a synchronization signal. This diagram is intended to provide a visual example of the manner in which the synchronization pulse could affect the repeatable production of an extruded article. The x-axis in the figure represents elapsed time, while the y-axis represents the deviation of each parameter from its norm (where each norm is represented by a horizontal line). Each input parameter can be associated with a particular device that works with the extruder, such as a motor affecting extrusion speed, heaters for the extruder, a pulling device, or an air sizing device.

Two vertical lines, P1 and P2, represent times at which synchronization signals are sent to one or more of the control nodes. The synchronization signals cause each device to return to its normal value and continue its operation from that normal value. Thus, over time, the operating values of the various inputs can vary and drift from their normal values. Because the interrelationships between the various inputs can be very complex, the drifts might simply cancel each other out or, alternatively, they could amplify each other. In the former case, the various drifts would have little or no effect on the output, while in the latter case, there would be a severe effect on the output. However, as each of the devices drift father from their respective norms, the likelihood that the output will be noticeably affected increases, and the system will become more unstable. Thus, the synchronization signal may be generated at the appropriate time even if the output is still good, to ensure that the system does not enter a point at which the output could quickly become bad.

The synchronization signals reduce the danger that the drifts will reinforce each other, because the signals cause each input to return to a normal value which is understood to produce a proper and relatively stable output when the other inputs also return to their normal values. The synchronization signals may be generated at any appropriate interval, such as once for each produced part.

Figure 3:
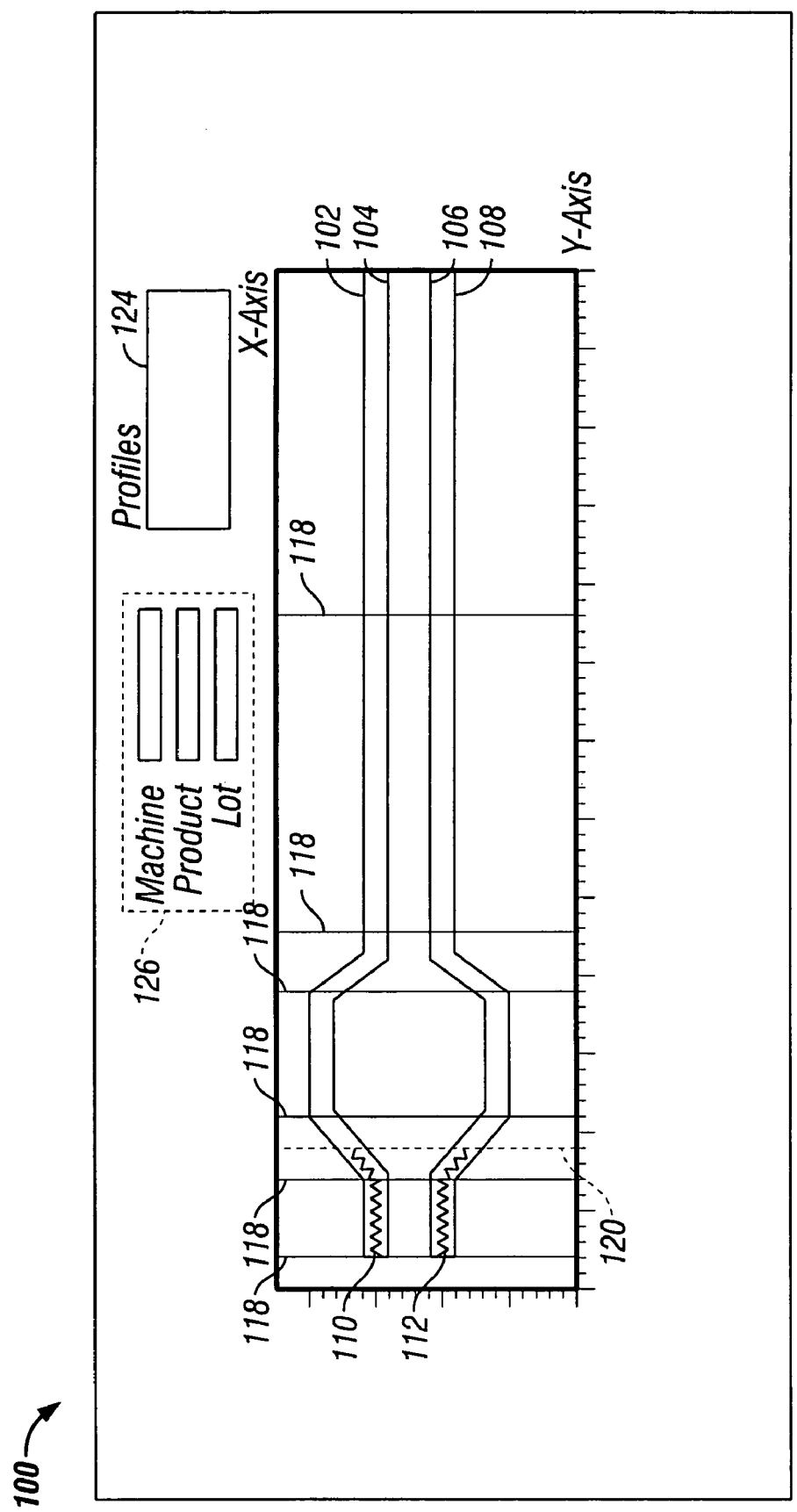
FIG. 3 shows a display that may be provided to the operator of an extruder

FIG. 3 shows a display 100 that may be provided to the operator of an extruder. In a center window 101, a profile of an article, such as a balloon catheter, is displayed. As shown, parameters of the article change at particular points so that, for example, the article may be produced as a single part having varying diameter. The profile is shown as two cross-section edges for a generally cylindrical object of varying diameter. The outer radius as viewed from the top or bottom of the article is represented by two x-dimension lines 102, 104, which, respectively, represent the maximum and minimum specified radius for the article in the x-dimension. The outer radius as viewed from the sides of the article is represented by two y-dimension lines 106, 108, which, respectively, represent the minimum and maximum specified radius for the article in the y-dimension. These lines thus provide a visual cue to the operator during the production of the article regarding the expected dimensions of the article, and when read together, they provide an indication of the ovality of the article. As the production occurs, tracking lines 110, 112 are provided on display 100 and correspond to the actual radii of the article as it exits the extrusion die, as measured by laser gauges or other instruments. These lines therefore provide the operator with an indication of the actual progress of the extrusion, as compared to the expected and specified parameters. While the tracking lines 110, 112 as shown in the figure move from left to right across the screen in the figure as the article exits the die, the tracking lines could be produced at a constant vertical position on the screen, and the dimension lines 102, 104, 106, 108, could scroll from right to left across the screen as each part is produced, or the tracking lines could move from right to left, or the progress of the part could be shown in any appropriate manner. Also, other process parameters, such as a durometer reading, an indication of ovality, or an indication of wall thickness, could be provided to the operator either numerically or graphically in a similar manner. Moreover, the tracking lines 110, 112 or other displayed parameters may be displayed as moving dots or short moving lines, rather than as lines that span display 101. The displayed size of the article shown in window 101 could also be controlled and varied.

Several vertical lines in display 101 represent time-based occurrences relating to the extrusion. For example, control output line 120 may represent air output control. Event markers 118 delineate "events" that bring a distinct change in the operating parameters of the extrusion process. For example, an event may mark a change in any relevant product attribute, such as material, size, coating, or elongational properties, or in a combination of attributes. Also, an event may represent the start of a geometric change in the article, such as an intended increase in outside diameter (as indicated by all but the right-most event marker 118). The event can also trigger more complex changes. For example, the event can trigger a PID control sequence, such as an increase in sizing air pressure that results in a taper in the extruded article. Also, display 101 may be arranged so that the operator can click on or touch a particular event marker 120 and be presented with control information, such as in a pop-up window, associated with the event, such as various PID parameters. Multiple PID loops may be used with regard to a single line, and other modes of control may also be employed. The PID control may also be a forward-looking PID.

Other areas of display 100 provide other information related to the extrusion process. For example, file view box 124 shows the name of the part currently being produced, by showing a recipe name and certain dimensions of the article. The box 124 may contain the names of multiple definition files to which the system has access. The operator may highlight a particular file, or may touch the screen or click on the file name to load a particular file that contains information on the process parameters for a particular article, and to produce the information shown elsewhere on display 101. Description area 126 provides information relating to the particular manufacturing run, such as the name of the machine (or extruders) on which the run is performed, the product name or number, and a lot number. For example, the machine (i.e., particular extruder or extruders) for which the profile and recipe were established may be shown, the product number or descriptor to be produced from the file may be indicated (so that the operator can confirm that the appropriate file is being used), and the particular lot number may also be provided. One or more of the entries in the description area 126 may be edited, and the information in the description area 126 may be stored for later retrieval or may be associated with other data. For example, an operator may call up a file, change the description of the product, and produce a group of articles that receive a lot number automatically generated by the system or retrieved from a central system. That information may then be stored in a log file or other appropriate file, along with other information about the production of that lot (such as the data acquired during production, the number of articles produced, the date, etc.), and may be later accessed, such as to troubleshoot problems with the articles that are produced, or for analysis, such as by using statistical process control techniques.

Although window 101 is shown as displaying data relating to an x-axis radius and a y-axis radius, it could also display the various parameters and attributes of the extrusion process and the extruded article in any other appropriate manner. For example, an "axis" view could be provided to show the cross-section of the article as it is produced. Thus, the axis view might show a pair of concentric circles that represent the minimum and maximum specified diameters for an article at a particular location. Also a side view of a part could also be displayed. Such a view would look similar to that shown in FIG. 3, but the upper profile lines would represent the radius of the article above its centerline, while the lower profile lines would represent the radius of the part below its centerline. Such a view would thus present a side cross-section of the article.

Other display controls (not shown) could also provide additional functionality in the operation of display 100. For example, buttons may be provided to allow an operator to change the current view that is presented in window 101. Controls may also be provided to allow a user to load or save information regarding an article or a particular production run. For example, the user may load a selected profile and recipe, and may save the profile or recipe if changes have been made to it. Additionally, the user may save data that has been collected relating to a particular run of the machine. The user may also exit from the application, such as to shut the system down or to switch to another application. The system may be integrated as part of a windowed operating system so that the user can also switch easily to other applications without exiting display 100.

Also, display 100 may be configured to allow a user, such as a designer or engineer, to build or modify an article profile on-screen. For example, the user could draw particular profile lines and establish or modify event markers interactively on display 101. The user could also be provided with a worksheet into which the user could enter data relating to each discrete segment of an article. Alternatively, information for defining the recipe and profile of an article can be imported from another design program or from an appropriately-formatted file, such as over a network or removable media.

Display 100 may also provide controls to allow a user to configure particular data acquisition devices. For example, the user may be given graphical controls to select particular features associated with a laser diameter gauge, such as the communication port and communication rate for the diameter gauge. The user may also adjust operating parameters of the device such as whether the laser gauge measures across the article in one or multiple dimensions, whether the values displayed (which are generated as an average of all the samples taken over a particular time period) are averaged over the sampling time or over all the number of samples, the number of samples made per second, and the frequency of the samples used in computing the average.

Display 100 may also allow a user to tune certain parameters of the various control nodes associated with an extrusion control system. For example, the inner diameter sizing air device on an extruder may require a particular control sequence to create an extrusion having an inner diameter that changes from one value to another. This control sequence can be associated with an event marker and can be established by setting the various PID parameters in a manner known to those skilled in the art. Also, the operator may wish to alter certain parameters while the process is occurring, for example, if the system shows that the process is repeatedly operating outside of desired ranges.

Figure 4:
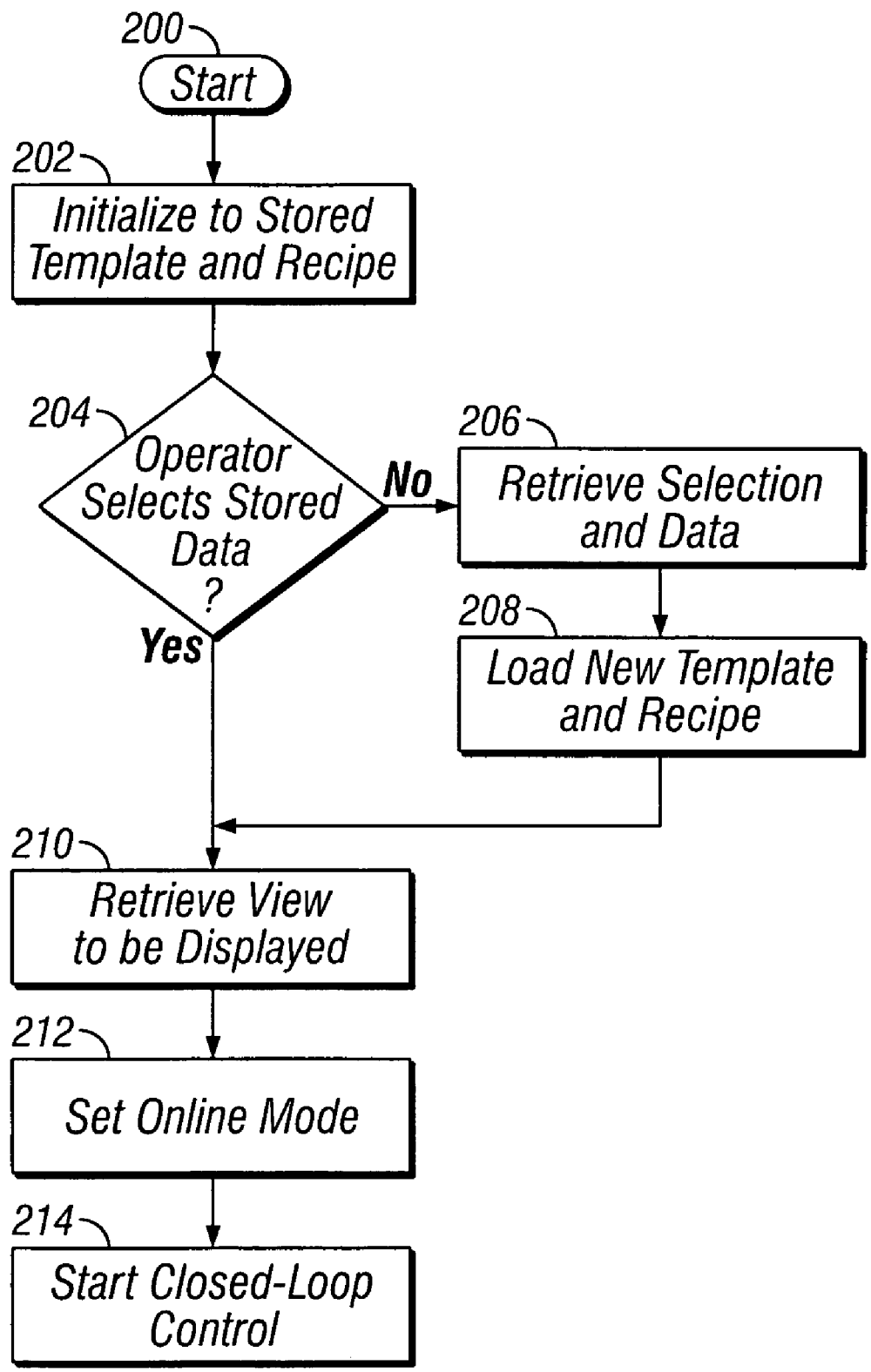
FIG. 4 is a flow chart showing a procedure for initiating an extrusion control system.

FIG. 4 is a flow chart showing a procedure for initiating an extrusion control system. The system may be established to produce discontinuous articles according to a "recipe" of materials and a profile template. For example, in the case of a balloon catheter, the profile template may represent the cross-section of the catheter from the tip, across the balloon, and along the catheter shaft, and could take into account the inside diameter, the outside diameter, and various durometers along the length of the part, and the specific length of each portion of the catheter. The recipe for the catheter could represent the proportion of material from each extruder in a co-extrusion that is to be provided for each portion of the catheter. At step 200, the system is first started, such as by resetting, initially turning it on, or otherwise resynchronizing the system. The system at first initializes, by reading from its memory, the values for the recipe and profile associated with a particular article, such as the last article that was produced by the system (step 202). The operator of the system may then be given the opportunity, at step 204, to produce articles according to the stored profile, to select another stored profile (whether stored within the system or elsewhere), or to enter the parameters for a new profile. If the operator selects the stored recipe and profile, the system provides a display on the operator's screen that corresponds to that profile and recipe. If the user chooses not to use the stored recipe and profile, the system provides the operator, at step 206, with the opportunity to select another stored profile or to enter the parameters for a new profile. The parameters for a stored profile may have been entered earlier by the user, may be accessed from another computer where the parameters were defined, or may be extracted from other data, such as the data of a CAD/CAM system. After the operator has selected or entered a desired recipe and profile, the system loads the recipe and profile at step 208 and displays it to the operator at step 210. The operator may then continue with the selected part, may modify the profile or recipe, or may select a different part to produce. Once the operator chooses to go on-line with the production of the articles at step 212, the system starts its closed-loop control at step 214 and begins operating the extruder or extruders.

Figure 5:
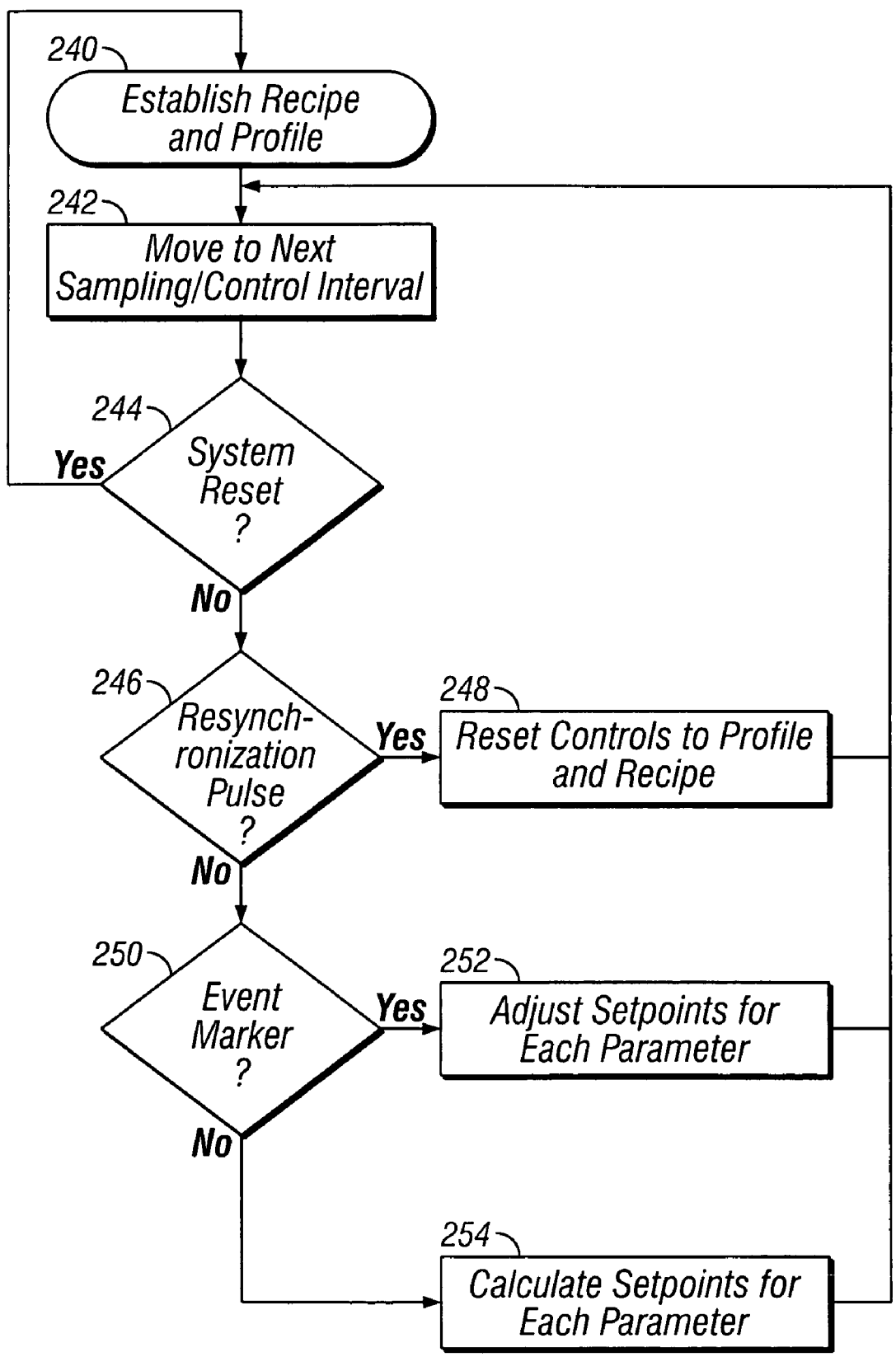
FIG. 5 is a flow chart showing the general operation of an extrusion control system.

FIG. 5 is a flow chart showing the general operation of an extrusion control system. In general, this flow chart shows steps that may be followed by the system once the closed-loop control discussed with respect to FIGS. 2-4 has begun. Initially, at step 240, a recipe and profile are established for a particular article or articles. For each location along the length of the article, the various parameters, such as melt pump speed and wall thickness, may have either preset or computed values. For example, the inner diameter of a tube may have a set value where the diameter is constant along the article's entire length, and may have a computed value where the outer diameter is tapering. Therefore, at step 242, for each sampling or control interval, values of the relevant parameters are read from the various data acquisition nodes, and signals may be sent to the various control nodes in the system. The control interval could be separate and different for receiving data as it may be for sending control information, and either sampling interval may be set for an appropriate length of time. For example, in the production of medical catheters, a sampling interval of 1-10 milliseconds per sample may be appropriate.

At step 244, the system checks to determine whether there has been a reset condition, such as an operator-induced interruption of the production process or a shut-down of the control system. If there has been a reset, the system may return to the parameter values of the current recipe and profile, or may conduct a process like that shown in FIG. 4 to obtain the operator's desired recipe and profile.

A synchronization signal is provided at step 246. As an example, a standard network reset signal may be directed to the data bus, to the control bus, to both, or to any other communication medium in the system. The signal may be provided at a periodic basis (such as every several seconds), upon the occurrence of a particular process event (such as the completion of a distinct article), or upon the occurrence of a particular process value (such as a value of a parameter or multiple parameters that indicates a system fault). The signal may be sent over the data bus or the control bus, or it may be sent over its own communication lines. When the signal occurs, the system returns to using the stored parameters for the recipe and profile of the article being produced, as shown by step 248. In some cases, a synchronization may produce a sudden step, or discontinuity, in these cases, it is preferable to do so within the discard section of the software.

At step 250, the process encounters an event marker that indicates the profile or recipe (or some other parameter) of an article needs to change. At this step, the system returns to the profile or recipe definitions to obtain the needed parameters for the extrusion process. The system may then read the new values and adjust the set points for any relevant parameters accordingly, as shown at step 252. Alternatively, if no event marker is encountered during a relevant sampling or control interval, the system may simply continue operation, such as by using existing constant parameters or by calculating new values for changing parameters (such as the article diameter, where the article is tapering). In addition, the set points may be continually adjusted to maintain the appropriate output for the system.

Figure 6:
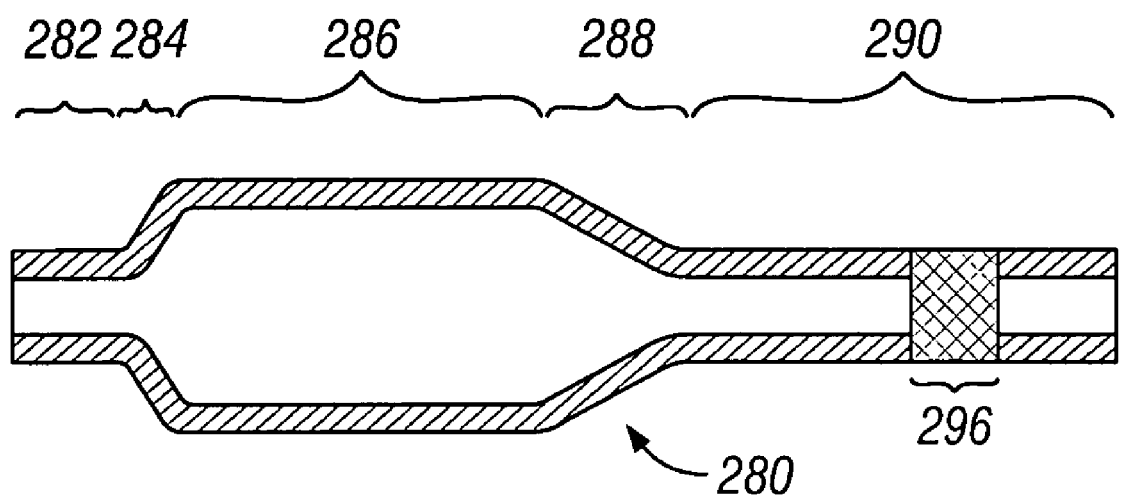
FIG. 6 shows a profile of a medical balloon catheter that may be produced by an extrusion process.

FIG. 6 shows a profile of a medical balloon catheter 280 that may be produced according to the disclosure above. The catheter 280, as shown, has been severed from other catheters on each of its ends, but would normally be made as part of a continuous, repeating article in an extrusion process. The catheter 280 is also comprised of a number of distinct sections. Catheter 280 may have a first geometric section 282 having a constant inside and outside diameter, followed by a second geometric section 284 having an increasing diameter from left to right, and a thinner wall thickness than the thickness of first geometric section 282. The wall thickness may be reduced, for example, by providing additional tension on the string of catheters, such as by a mechanical pulling device, while they are being extruded. A third geometric section 286 of constant diameter and having a thin wall is followed by an fourth geometric section 288 of decreasing diameter having a thin wall. The relatively thin wall in sections 284, 286, and 288 allow those sections to expand more easily than the rest of catheter 280, and thus to form a balloon area in catheter 280. A fifth geometric section 240 has a constant diameter and thickness, and has a section of changing composition 296 in it. Thus, the composition of the plastic to the right of section 296 is different from the composition of the plastic to the left of section 296, and section 296 comprises a transition area in which the two plastics are mixed. For example, the plastic to the right of the transition may be less pliable than the plastic to the right, so that the main shaft of the catheter may be pushed through passages to get to the desired location during a medical procedure.

The system and methods described above permit precision and repeatability in the production of discontinuous parts in a continuous extrusion process. In particular, the resetting of certain parameters with each part provides a predictable measuring point from which to base the operation of the control nodes. It also removes inherent error and instability that may build up during the operation of a closed-loop system having multiple input variables. Thus, for example, the system and methods described above are capable of producing extruded articles, both straight and tapered, with cross-sectional control to 0.0005 inches and below, and allows continuous, on-line characterization of extrusion attributes.

In addition, the system and method produce extruded articles that have very repeatable property transitions. In other words, property transitions on the one-hundredth part produced in a continuous process will be substantially the same as the property transitions for the first part. For example, the system and method can produce repeatable changes in material hardness (durometer), material surface tactile characteristics, and material molecular structure orientation.

The system and method may also achieve very repeatable placement on extruded parts of features external to the extruder. That is because such external operations may also be keyed to the location of a base point that is reset periodically, such as for each part. For example, in producing a medical balloon catheter, repeatable placement of marker bands, stents, and material coatings may be achieved. Also, variation in the length of parts may also be minimized, such that the cut length of the parts produced in an extrusion process would vary from each other by less than 0.1 percent, i.e., a ten inch part can be repeatably cut between 9.99 inches and 10.01 inches.

EXAMPLES

Example No. 1

Production of an Extruded Article of Varying Cross-Section

A material hopper of an extrusion apparatus, such as a positive displacement apparatus, is filled with Pebax 7233 nylon. The apparatus is started, and plastic begins to exit from the diehead. The diehead has a conical outer ring and an inner tip, positioned so as to create a cylindrical tube of material. The outer ring has an inner diameter of 0.0770, and the outer edge of the inner tip is spaced from the outer face of the outer ring by 0.002 inch.

The initial material to exit from the polished spiral diehead is a cylindrical tube, and forms a catheter balloon blank. The temperatures of the apparatus are set as follows:

| | |
|---|---|
| Feed Liner | 80° F. |
| Barrel - Zone 1 | 300° F. |
| Barrel - Zone 2 | 335° F. |
| Barrel - Zone 3 | 360° F. |
| Barrel - Zone 4 | 360° F. |
| Clamp | 360° F. |
| Filter | 360° F. |
| Melt Pump (lcc/rev) | 360° F. |
| Diehead | 370° F. |

Other parameters of the apparatus are set as follows at start-up: melt pump rpm 75.02; puller speed 22.10 rpm; extruder speed 4.65 rpm; tank gap 0.1146 inches; water dam diameter 0.089 inches; screw ¾ inch; air pressure 3 inches of water.

When material exits the die, it is strung through a waterbath, an ultra sonic gauge, a vacuum wipe, and an o.d. gauge, and then passed over a speed laser and into a puller. The material then passes through a cutting device to a blowoff conveyor. The control system is started once the initial line is strung. Once started, the system receives measurement data from the online measuring devices, and auto loop adjusts air, puller speed, extruder rpm, and meltpump rpm (or any combination of these parameters) to maintain the product exiting the die at the intended parameters. A synchronization pulse is sent to each device that needs to synchronize at an interval of once per part.

The resulting catheter has the following dimension and tolerances: length of 13 inches +/−0.020 inches; i.d. of 0.0215 inches; o.d. of 0.0395 inches; wall of 0.0090 inches. Each of the i.d., o.d., and wall thicknesses have tolerances of less than or substantially equal to 0.0003 inches.

Example No. 2

Production of an Extruded Article With Different Materials

A first hopper of a co-extrusion apparatus, such as a positive displacement apparatus, is filled with LDPE (Plexar) to act as the tie layer. A second hopper of the apparatus is filled with HDPE (Marlex) to act as the inner layer, and a third with Nylon 12 such as Grilamid L20 base with a 50% concentration of an injection grade Nylon 12 (Nanocomposite), as the outer layer. The three layers are delivered via a highly polished spiral helicoid to a mandrel inserted into the die opening and positioned flush with the die face or slightly protruding under pressure. The die has a circular outer ring and an inner plug, positioned so as to create a cylindrical tube of material. The outer ring has an inner diameter of 0.042 inches, and the outer edge of the inner plug is spaced from the inner diameter of the outer ring by 0.100 inches. The three materials are delivered to exit the die simultaneously to form a three layer tube. The middle tie layer does not use a melt pump to deliver material to the diehead, and the amount of material to be delivered is controlled by the screw speed. The inner layer and the outer layer use a melt pump to deliver their respective materials to the die head. On line ultrasonic gauging is used to measure the three layer thicknesses. The ultrasonic unit sends the information to the control system, and the pump and screw speeds are automatically adjusted to attain the desired wall percentages. The ultrasonic gauge also measures the overall wall thickness and the control system translates this information, and signals the puller to increase or decrease speed as necessary. Supplied air is used to maintain a consistent inner diameter (i.d.) under control of the control system. The concentricity of the layers is controlled by the control system using mechanical adjustment cylinders with spring loaded pistons, in the head, that apply and release pressure to the ring which holds the die.

The plastic is melted in the extruders using three 1000 watt heaters set to maintain a temperature of 195° C. in the melt pool of the first extruder and 201° C. in the second extruder. The die is also heated to a temperature of 210° C. by heaters. The control system monitors the temperature settings of all three extruders. All parameters and outputs controlled by the control system are recorded automatically. All data recorded is stored securely and may not be altered. The control system includes software that records and interprets the capabilities of the process.

The blower speed and pulling mechanism are speed controlled in a closed-loop manner. The speed of the puller may be changed as necessary, to consistently keep the overall wall thickness. The ultrasonic gauge sends the information to the control system and the signal is made to change the speed. When a new tube is to be produced, the set points for the blower and the pulling mechanism are reset by a synchronization pulse. Once the tubing has passed through a surface blemish detector, only the good parts are kept via a blowoff setting controlled by the control system. The bad parts (only the portion of the tube that was bad plus 1 inch) are diverted to a scrap receptacle that is situated on a scale. The cutting sequence is triggered as often as necessary so that good parts are saved and bad parts are not. The control system records and tracks the bad material by weight. The synchronization along with real time linespeed monitoring (a device that reports to the control system) helps ensure a very precise, consistent length.

This tube may also be produced with multiple tapers. The tube specifications are entered into the control system, and the ramps and their lengths are automatically set to realize the specification. The ultrasonic gauge provides real time information to the control system, and real time changes are made as necessary to maintain concise tapers. These tubes are also subjected to the blemish detection system. The synchronization sequence allows for only good parts to be saved, and bad parts are separated.

One example of a resulting catheter produced according to the present invention may have the following dimensions and tolerances. The tube with no taper would has an o.d. of 0.0253 inches, and an i.d. of 0.0176 inches. The wall percentages is 15 percent on the tie layer and 42.5% on the outer and inner layer. The tapered tube has a proximal o.d. of 0.0253 inches with an i.d. of 0.0193 inches, and the distal end has an o.d. of 0.0226 inches, with an i.d. of 0.0176 inches. The layer percentages are the same as the straight tube. Concentricity of the walls is 0.0002 inch maximum difference. The i.d. and o.d. tolerances are about +/−0.0003 inches. The layer percentages is no more than about +/−3 percent.

A number of embodiments of the invention have been described. Nevertheless, it will be understood that various modifications may be made without departing from the spirit and scope of the invention. For example, although many of the examples have been described with relation to the production of medical catheters, the systems and methods described could be used to produce any appropriate article (or articles) in a broad range of fields. Also, although a particular user interface may be illustrated in the embodiments above, the invention is capable of operating with all sorts of interfaces. Moreover, the particular devices that interface with the control system and the manner in which they are interfaced can be modified according to the needs of the system. Accordingly, other embodiments are within the scope of the following claims.

What is claimed is:

1. An extrusion control system for use with one or more extruders, comprising:
   a data acquisition module in communication with one or more data acquisition nodes arranged to gather data from an extrusion process;
   a control module in communication with one or more control nodes to control the extrusion process in association with information obtained from the data acquisition module;
   a synchronization signal generator to generate a synchronization signal for the one or more control nodes to cause the one or more control nodes to periodically reset to an earlier setting determined before a current operation cycle; and
   an electronically-stored part profile that corresponds to an extruded part to be produced by the one or more extruders, wherein the control module is operable to use the part profile to produce a plurality of continuously extruded parts matching the part profile.

2. The extrusion control system of claim 1, wherein the part profile comprises a representation of the outer diameter of the extruded part.

3. The extrusion control system of claim 2, wherein the part profile comprises a minimum specified part profile and a maximum specified part profile.

4. The extrusion control system of claim 1, wherein the synchronization signal generator generates the synchronization signal at a substantially repeating period.

5. The extrusion control system of claim 4, wherein the substantially repeating period is a function of the length of the extruded part.

6. The extrusion control system of claim 5, wherein the synchronization signal is generated for each part.

7. The extrusion control system of claim 1, further comprising a first event marker associated with the part profile, whereby the synchronization signal generator generates the synchronization signal when the system encounters the event marker.

8. The extrusion control system of claim 7, wherein the first event marker corresponds to the beginning of the part profile.

9. The extrusion control system of claim 7, wherein the first event marker corresponds to the end of the part profile.

10. The extrusion control system of claim 1, wherein the data acquisition module and the control module are each in communication with a computer that monitors and controls the operation of the one or more extruders.

11. The extrusion control system of claim 10, further comprising a display associated with the computer that presents an image of the part profile.

12. The extrusion control system of claim 1, wherein the synchronization signal generator communicates with each of the one or more control nodes over a dedicated communication channel.

13. The extrusion control system of claim 12, wherein the synchronization signal comprises a synchronization pulse.

14. The extrusion control system of claim 1, wherein the synchronization signal generator communicates with each of the one or more control nodes over a shared communication medium.

15. The extrusion control system of claim 1, further comprising a velocity sensor that allows the velocity of an extruded article to be measured, wherein data from the velocity sensor is used by the control module to control an extrusion speed for the one or more extruders.

16. The extrusion control system of claim 1, wherein a data acquisition node comprises a laser gauge.

17. The extrusion control system of claim 16, wherein the laser gauge acquires data relating to the outside diameter of an extruded article produced by the extrusion process.

18. The extrusion control system of claim 1, wherein the control module communicates with control nodes on more than one extruder.

19. The extrusion control system of claim 18, wherein the control module causes a switchover from a first material in a first extruder to a second material in a second extruder.

20. The extrusion control system of claim 1, further comprising a reporting module that provides data acquired by the data acquisition module.

21. An extrusion control system for use with one or more extruders, comprising:
   a data acquisition module in communication with one or more data acquisition nodes arranged to gather data from an extrusion process;
   a control module in communication with one or more control nodes to control the extrusion process in association with information obtained from the data acquisition module; and
   a synchronization signal generator to generate a synchronization signal for the one or more control nodes to cause the one or more control nodes to periodically reset to an earlier setting determined before a current operation cycle,
   wherein the control module is in communication with a PID controller associated with a variable speed drive for the one or more extruders, and the synchronization signal causes the PID controller to return to a preset speed.

22. An extrusion control system for use with one or more extruders, comprising:
   a data acquisition module in communication with one or more data acquisition nodes arranged to gather data from an extrusion process;
   a control module in communication with one or more control nodes to control the extrusion process in association with information obtained from the data acquisition module; and
   a synchronization signal generator to generate a synchronization signal for the one or more control nodes to cause the one or more control nodes to periodically reset to an earlier setting determined before a current operation cycle at a predetermined interval,
   wherein the control module carries out a PID control sequence after the synchronization signal generator generates the synchronization signal.

23. An extrusion control system for use with one or more extruders, comprising:
   a data acquisition module in communication with one or more data acquisition nodes arranged to gather data from an extrusion process;
   a control module in communication with one or more control nodes to control the extrusion process in association with information obtained from the data acquisition module; and
   a synchronization signal generator to generate a synchronization signal for the one or more control nodes to cause the one or more control nodes to periodically reset to an earlier setting determined before a current operation cycle,
   wherein the control module is in communication with a sizing air device controller associated with an extruder, and the synchronization signal causes the sizing air device controller to set to a predetermined value.

* * * * *